(12) United States Patent
Derrien et al.

(10) Patent No.: US 8,881,392 B2
(45) Date of Patent: Nov. 11, 2014

(54) METHOD OF REPAIRING MACHINED COMPONENTS SUCH AS TURBOMACHINE BLADES OR BLADES OF BLISKS

(75) Inventors: Gérard Derrien, Houilles (FR); Stéphane Kerneis, Velizy-Villacoublay (FR); Ludovic Gasne, Sassenay (FR); Claude Leonetti, Courcouronnes (FR)

(73) Assignee: Snecma, Paris (FR)

( * ) Notice: Subject to any disclaimer, the term of this patent is extended or adjusted under 35 U.S.C. 154(b) by 1138 days.

(21) Appl. No.: 12/532,173

(22) PCT Filed: Mar. 19, 2008

(86) PCT No.: PCT/FR2008/000367
§ 371 (c)(1),
(2), (4) Date: Nov. 30, 2009

(87) PCT Pub. No.: WO2008/135656
PCT Pub. Date: Nov. 13, 2008

(65) Prior Publication Data
US 2010/0095526 A1 Apr. 22, 2010

(30) Foreign Application Priority Data
Mar. 20, 2007 (FR) ...................................... 07 02021

(51) Int. Cl.
| | |
|---|---|
| *B23K 26/02* | (2014.01) |
| *F01D 5/34* | (2006.01) |
| *B23P 6/00* | (2006.01) |
| *G05B 19/42* | (2006.01) |
| *F01D 5/00* | (2006.01) |
| *G05B 19/4097* | (2006.01) |

(52) U.S. Cl.
CPC *F01D 5/005* (2013.01); *F01D 5/34* (2013.01); *B23P 6/007* (2013.01); *G05B 19/4207* (2013.01); *G05B 2219/32228* (2013.01); *G05B 2219/45147* (2013.01); *G05B 19/4097* (2013.01)
USPC .......................... 29/889; 29/889.1; 29/889.23

(58) Field of Classification Search
CPC .......... B23P 6/002; B23P 6/005; B23P 6/007; B23P 6/045
USPC ......... 29/889, 889.1, 402.09, 402.11, 402.13, 29/402.16, 402.18
See application file for complete search history.

(56) References Cited

U.S. PATENT DOCUMENTS

| | | | | |
|---|---|---|---|---|
| 6,969,821 | B2 * | 11/2005 | Mika et al. | 219/121.83 |
| 7,810,237 | B2 * | 10/2010 | Lange et al. | 29/889.1 |

(Continued)

FOREIGN PATENT DOCUMENTS

| | | |
|---|---|---|
| EP | 1 457 853 | 9/2004 |
| WO | WO 2004096487 A1 * | 11/2004 |

OTHER PUBLICATIONS

Zheng, Jianming et al. "Worn area modeling for automating the repair of turbine blades", The International Journal of Advanced Manufacturing Technology. vol. 29, No. 9-10, pp. 1062-1067, (Jun. 7, 2006), XP019418863.

(Continued)

*Primary Examiner* — Christopher Besler
(74) *Attorney, Agent, or Firm* — Oblon, Spivak, McClelland, Maier & Neustadt, L.L.P.

(57) ABSTRACT

A method of using machining to repair a component workpiece, such as a turbomachine blade, from a known profile of the component, is disclosed. The method includes deforming the profile using a morphing method so that the deformed profile interpolates a cluster of points measured on the component. Deforming the profile involves comparing each zone of the component workpiece that has excess or insufficient thickness with elementary deformation configurations (EDCs) each in the form of a mesh portion and of points, the elementary deformation configurations (EDCs) being filed in a database, the database associating the parameters of the morphing function with each elementary deformation configuration (EDC).

11 Claims, 4 Drawing Sheets

(56) References Cited

U.S. PATENT DOCUMENTS

2005/0234843 A1* 10/2005 Beckius et al. .................. 707/1
2006/0090336 A1 5/2006 Graham et al.

OTHER PUBLICATIONS

Gao, Jian et al. "Adaptive restoration of complex geometry parts through reverse engineering application", Advances in Engineering Software, vol. 37, No. 9, pp. 592-600, (2006), XP005572695.

* cited by examiner (5a)

(5b)

METHOD OF REPAIRING MACHINED COMPONENTS SUCH AS TURBOMACHINE BLADES OR BLADES OF BLISKS

BACKGROUND OF THE INVENTION

The invention relates to the field of repairing machined components such as turbomachine blades or blades of bladed disks.

A turbojet engine comprises various rotors which revolve about its axis. These rotors comprise a disk, with a rim along which blades are attached. Conventionally, the blades are held by their root in a housing provided for that purpose. In order to meet ever tighter engine performance requirements, these rotors may now be produced as single pieces. There are then said to be bladed disks (or blisks). In a blisk, the blades and the disk form just one single component. To achieve this, a forged blank is machined to form the disk, the blades extending radially from its circumference, all as a single piece. It is also possible for some parts to be welded, the resulting blisk forming a single piece. The advantages of one-piece rotors are numerous, particularly in terms of mass.

As they are used, the blades experience wear (by erosion, friction) and also from impacts of various kinds resulting in severe damage (tears, burrs, cracks, etc.). The profile of the blades is therefore altered thus reducing the aerodynamic performance thereof. Because the blisk is made as one piece, it is not possible to extract a worn blade and replace it. It is therefore necessary to repair it in order to restore a suitable aerodynamic profile to that blade.

DESCRIPTION OF THE PRIOR ART

With reference to FIG. 1, in order to repair a blade 1 of a blisk, it is necessary to replace the damaged part with a piece of sound material or to add material in order to make good the wear 11. This addition of material is commonly known by those skilled in the art by its English name of "patch". This patch 2 is welded onto the surface of the blade 1 and the blade has then to be machined in order to restore its aerodynamic profile. Machining the damaged component 1 is a tricky operation that entails specific and highly accurate parameterizing of the machine tool. Specifically, the blisk that is to be repaired has a geometry that differs from the original geometry because of the deformation and wear that has appeared during the course of its life. This parameterizing is conventionally performed empirically, and is complicated because the damaged blade has to be restored to its original shape while at the same time taking account of the mean degree of wear of the blisk. It is therefore important to understand how the original shape of a blade is defined in order to be able to repair that blade.

Calculating a Theoretical Model

With reference to FIG. 2, a computer-based aerodynamic calculation 21 makes it possible to define a theoretical model of the blades 22. This aerodynamic calculation 21 makes it possible to obtain the profiles of the blade at given elevations (section levels) known as aerodynamic sections. The mechanical design department (MDD) converts these aerodynamic sections into Bezier curves and completes a wireframe volume predefined at the time of the aerodynamic calculation. From this wireframe volume, the MDD constructs a surface volume by applying mathematical Bezier elements to these curves in order to achieve the best possible fit in terms of the tangency and curvature of the desired profile. This construction is performed using any computer aided design (CAD) package capable of handling Bezier curves.

This set of elements forms a theoretical mesh B. The mesh B is designed to define precisely the three-dimensional (3D) volume of the blade. It is made up of mesh elements which may be triangles, quadrilaterals or other polygons. The mesh is more dense in those zones of the blade that have the greatest curvature. This theoretical mesh B serves as a design model for the whole of industrialization, machining, and for checking new components.

The theoretical mesh B cannot serve as a model for repair because it does not incorporate the wear and deformation that the component has experienced throughout its service life. It is necessary to rely upon a practical model representing the current condition of the component.

Measuring the Actual Component

With reference to FIG. 1, a volume-based measurement 12 of the damaged component 1 is performed by measuring the coordinates of the points on the surface of the component using three-dimensional measurement machines (3DMMs) with physical sensing or contactless measurement. This then yields a cluster of points A corresponding to the shape of the damaged component 1, known as the cluster of points, actual A.

Machining the Damaged Component

In order to repair the damaged component, CAM (computer aided manufacture) software uses so-called "MORPHING" functions to deform the theoretical model B into a practical model tailored to the wear and deformation observed on the damaged component 1.

The "INVERSE FUNCTION" corresponds to the conversion of the damaged component to the component in the new state. This inverse function is the function needed to parameterize the machine tool (the thickness to be removed in order to restore the correct dimension) in order to machine the damaged component 1.

The objective is to find the theoretical model deformation morphing function and to deduce the inverse function that will allow the machine tool to be parameterized.

Measuring the Topological Differences

By comparing the cluster of points, actual A and the theoretical model B, with reference to FIG. 3, a topological model 31 is created that makes it possible to identify 32 the zones that have insufficient thickness and the zones that have excess thickness. The machining path is then calculated on the model deformed by morphing 33 and the component 34 is machined in order to obtain the repaired component 3.

The topological model 31 comprises a set of points of coordinates $(x, y, z, \Delta)$, where x, y and z are the coordinates of each point in the cluster A along three orthogonal axes, $\Delta$ being the projection of the point onto the normal to the theoretical mesh element closest to said point.

Thus, if $\Delta$ has a positive value then the damaged component 1 has an excess of material by comparison with the theoretical model B, whereas if $\Delta$ has a negative value, the damaged component 1 has a deficit of material by comparison with the theoretical model B. Computer aided design (CAD) software such as the software package marketed under the trade name CATIA can be used to obtained topological models 31 in an automated manner and thus to visualize those zones that have an excess of material that need to be machined, and those zones to which material needs to be added.

Theoretical Deformation of the Mesh Using Morphing

In order to deform the theoretical model B using morphing, it is necessary to identify the best points of the theoretical model B to displace in order best to interpolate the maximum number of points from the cluster of points, actual A. These points are known as the control points. The theoretical mesh B can thus be deformed to obtain a mesh corresponding to the damaged component 1.

Complexity of the Morphing Step

Analyzing the topological model 32 in order to perform morphing is a complex step that requires experience and a high level of expertise. This is because any local modification to the position of a control point in the theoretical mesh B has an overall impact on the shape and position of the deformed Bezier surfaces and on the tangency where the surfaces meet.

Curvature and tangency conditions have also to be respected at irregularities in the shape of the blades. The experts calculate the best points of the theoretical model B to displace so that the differences between the deformed theoretical model and the points of the cluster of points A are as small as possible.

The morphing method is a slow and complex step the result of which varies according to the expert used. Calculating the morphing function is therefore a very tricky business. It is therefore not suited to industrial application.

The present invention sets out to alleviate at least these disadvantages.

SUMMARY OF THE INVENTION

The invention relates to a method of using machining to repair a component workpiece, such as a turbomachine blade, from a known profile of the component, the method comprising the following steps:

a. acquiring the coordinates of points on an envelope of the component workpiece, the set of points forming a cluster of points;

b. comparing the known profile with the cluster of points in order to define zones on the component workpiece that have excess or insufficient thickness;

c. deforming the profile using a morphing method so that the deformed profile interpolates the cluster of points, the deformation of the profile defining a morphing function, and d. machining the component workpiece using a machine tool parameterized on the basis of the morphing function.

According to the invention, the method is a method wherein the deforming of the profile involves comparing each zone of the component workpiece that has excess or insufficient thickness with elementary deformation configurations (EDCs) each in the form of a mesh portion simulating the profile (B), and points simulating points of the cluster of points (A), the elementary deformation configurations (EDCs) being filed in a database, the database associating the parameters of the morphing function with each elementary deformation configuration (EDC).

The method of the invention advantageously makes it possible to machine a component automatically, the parameters of the morphing function being known in the database.

From this morphing function the function for parameterizing the machine that is to machine the component that is to be repaired can be deduced. Automating the morphing process makes it possible to provide a stable and perfectly repeatable industrial process for these operations on components the shape differences and defects of which are not repeatable. This saves time, improves quality and therefore saves on cost.

As a preference, the profile of the component is in the form of a mesh of points.

Again as a preference, the coordinates and the displacement vectors of the points of the mesh that are to be displaced in order to interpolate the cluster of points, known as the control points, are parameters of the morphing function.

Still as a preference, a three-dimensional measurement machine (3DMM), with or without physical sensing, acquires the coordinates of the points on the envelope of the component workpiece.

Still as a preference, the component workpiece is a component to which material has been added.

The invention also relates to the database for implementing the method of the invention, associating the parameters of the morphing function with an elementary deformation configuration (EDC).

DESCRIPTION OF THE DRAWINGS AND OF THE PREFERRED EMBODIMENT

The invention will be better understood with the aid of the following description and of the attached drawing, in which.

Figure 4:
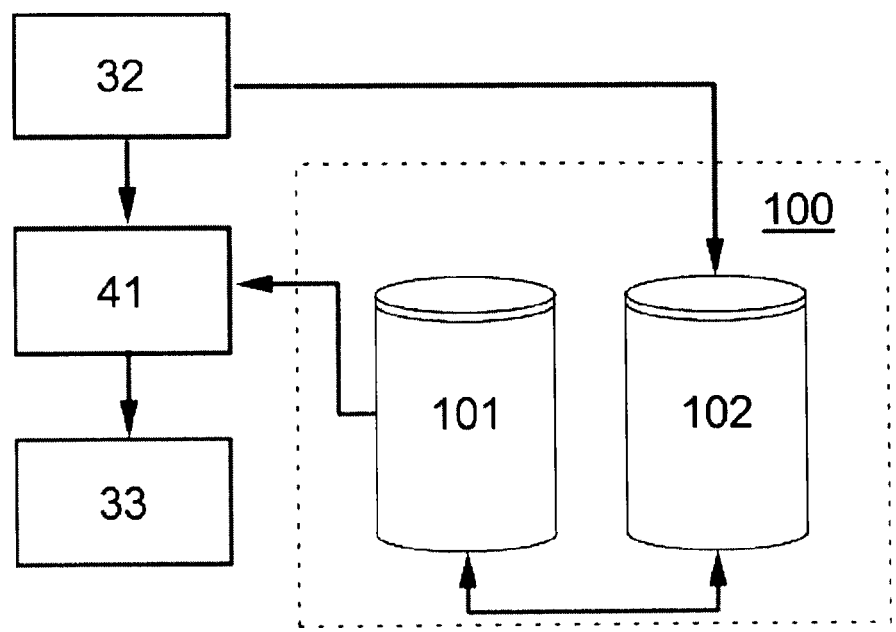
FIG. 4 depicts the steps for calculating the machining path on the theoretical model, deformed by morphing, according to the method of the invention.

With reference to FIG. 4, following an analysis of the overall topological model 32, the zones that have excess or insufficient thickness are compared with elementary deformation configurations (EDCs) 102 stored in a database 100 with parameters 101 that allow the theoretical model B to be deformed by morphing 41 in order to calculate the machining path 33.

Elementary Deformation Configuration (EDC)

An elementary deformation configuration (EDC) 102 is a parameterized surface defined by Bezier curves. An EDC here comprises a mesh portion formed of mesh elements which may adopt various patterns, and points representing the actual profile of the parameterized surface. The distance between the points and the mesh elements represents the differences in distance between the theoretical and actual profile of the parameterized surface.

An elementary deformation configuration (EDC) is an analysis from the local viewpoint of the morphing function. An EDC involves a mesh portion, simulating a mesh portion of the theoretical profile of the component, and several points simulating measurement points of the actual component. An elementary configuration EDC is a depiction of the differences there might locally be between an actual component and a theoretical profile.

In order better to define the EDC, with reference to FIG. 5a, the EDC 5 comprises a mesh portion made up of nine mesh elements arranged in three rows and three columns, each mesh element having four sides. The EDC 5 also comprises four points A1, A2, A3, A4.

The respective distances separating a point from its nearest mesh element is represented by a straight line running along the normal to said mesh element starting from said points A1-A4. These distances are similar to the difference measurements A defined hereinabove in respect of the topological model. The shorter these distances, the closer the mesh is to the points.

It goes without saying that an EDC in the form of a parameterized surface and which associates a value representative of a difference in deformation with each point on the surface would likewise be suitable. It goes without saying that a mathematical representation of the EDC in either bitmap or analytical form would likewise be suitable.

Storing the EDC Deformation Parameters in the Database

Again with reference to FIG. 5a, four control points B1-B4 are depicted on the mesh portion of the EDC 5. These correspond to the corners of the central mesh element. Displacing one control point leads to an overall modification to Bezier curves of the mesh, affecting both the length of the various sides of the mesh elements and their tangency with one another.

Selecting the control points to be displaced and their displacement vectors makes it possible to deform the mesh by morphing and to interpolate points A1-A4 better.

Figure 5:
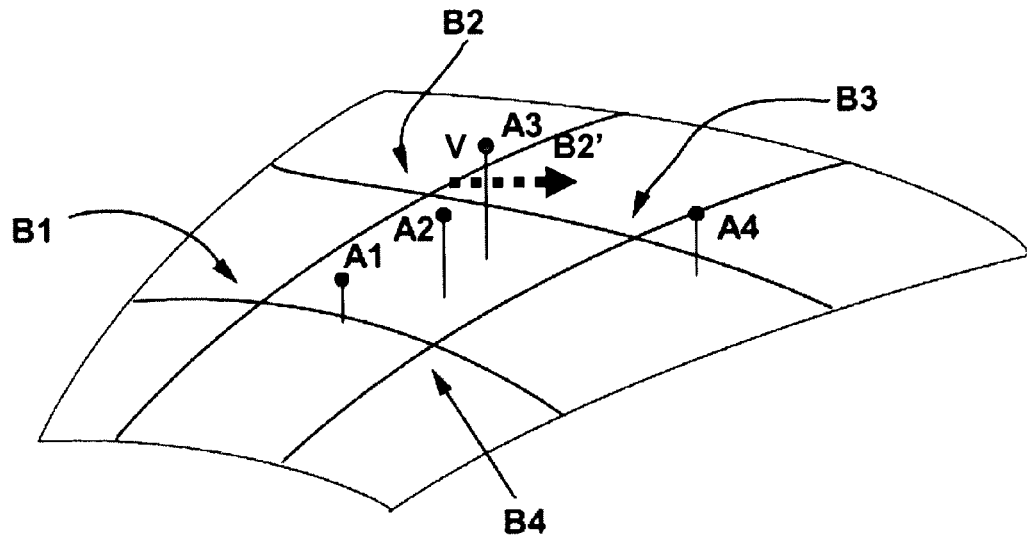
FIG. 5a depicts an elementary deformation configuration according to the invention.
FIG. 5b depicts the elementary deformation configuration of FIG. 5a after deformation by morphing.
Figure 5:
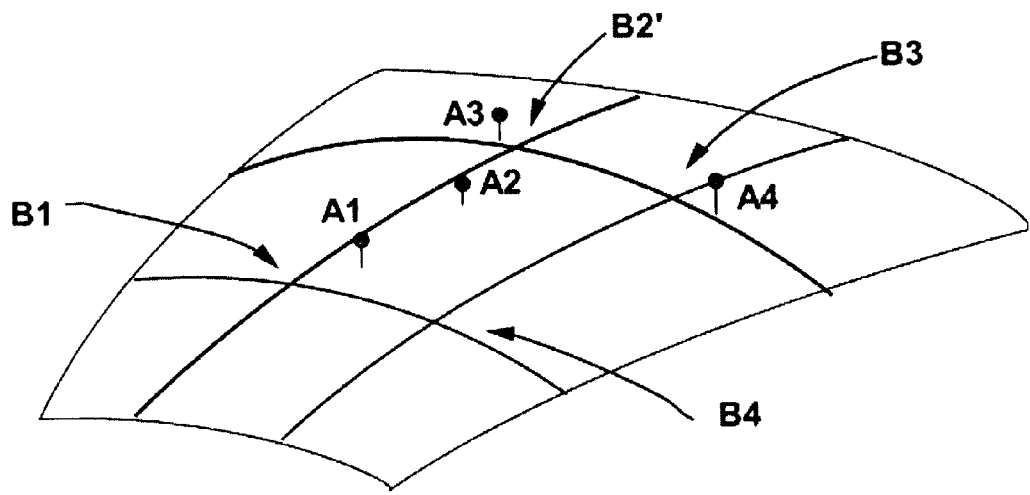

For each EDC and the database 100, these parameters have been calculated by an expert beforehand and entered into the database 100. With reference to FIG. 4, the database 100 relates each EDC 102 to these parameters 101. By way of example, FIG. 5 depicts the deformation by morphing of the mesh of the EDC of FIG. 5a. The control point B2 is displaced along the vector V to the point B2', thus allowing the mesh to interpolate points A1-A4. It may be noted, for example, that the differences between the points A1-A4 and the mesh have reduced in FIG. 5b. In the database 100, the EDC 5 is associated with the coordinates of the point B2 that is to be displaced and its displacement vector V.

In this example, just one control point, in this instance B2, is displaced. However, several control points may be similarly displaced in order to interpolate points A1-A4.

The database 100 contains numerous EDCs 102, with varying meshes and point positions, for which the optimal deformation of the mesh has been calculated in order best to interpolate the points. The EDCs 102 differ from one another in their curvature, concavity, number of mesh elements, connectivity of the connections, and tangency of the mesh elements.

Exemplary Embodiment

Having described the structure of the means of the invention, we shall now tackle how the invention works and can be implemented.

Figure 1:
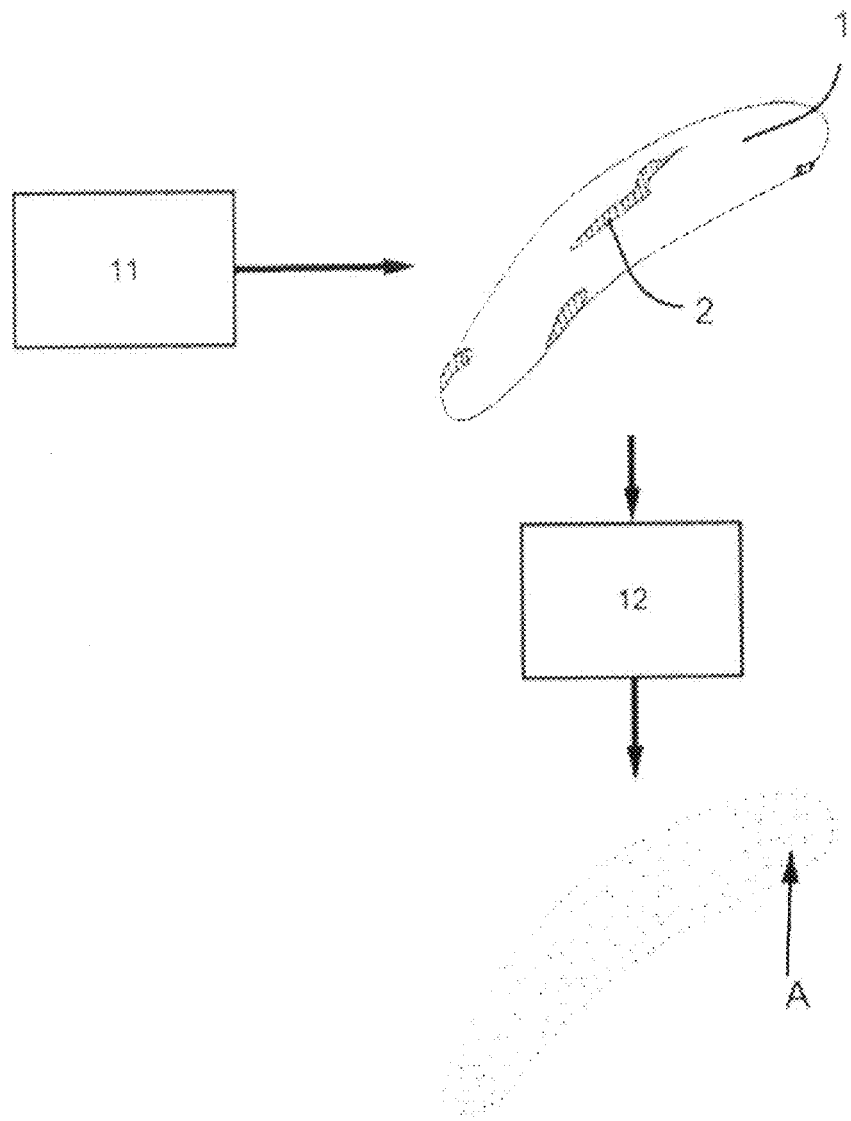
FIG. 1 depicts the step of acquiring the coordinates of points on an envelope of the component workpiece according to the invention.
Figure 2:
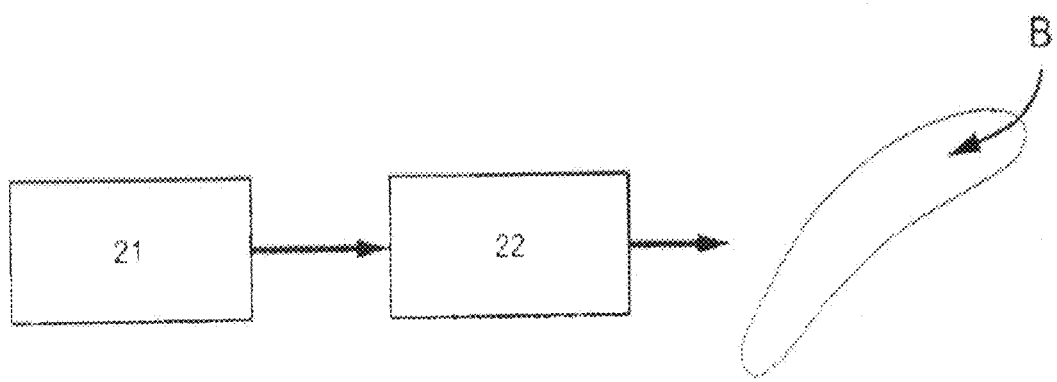
FIG. 2 depicts the steps of creating a theoretical mesh according to the invention.
Figure 3:
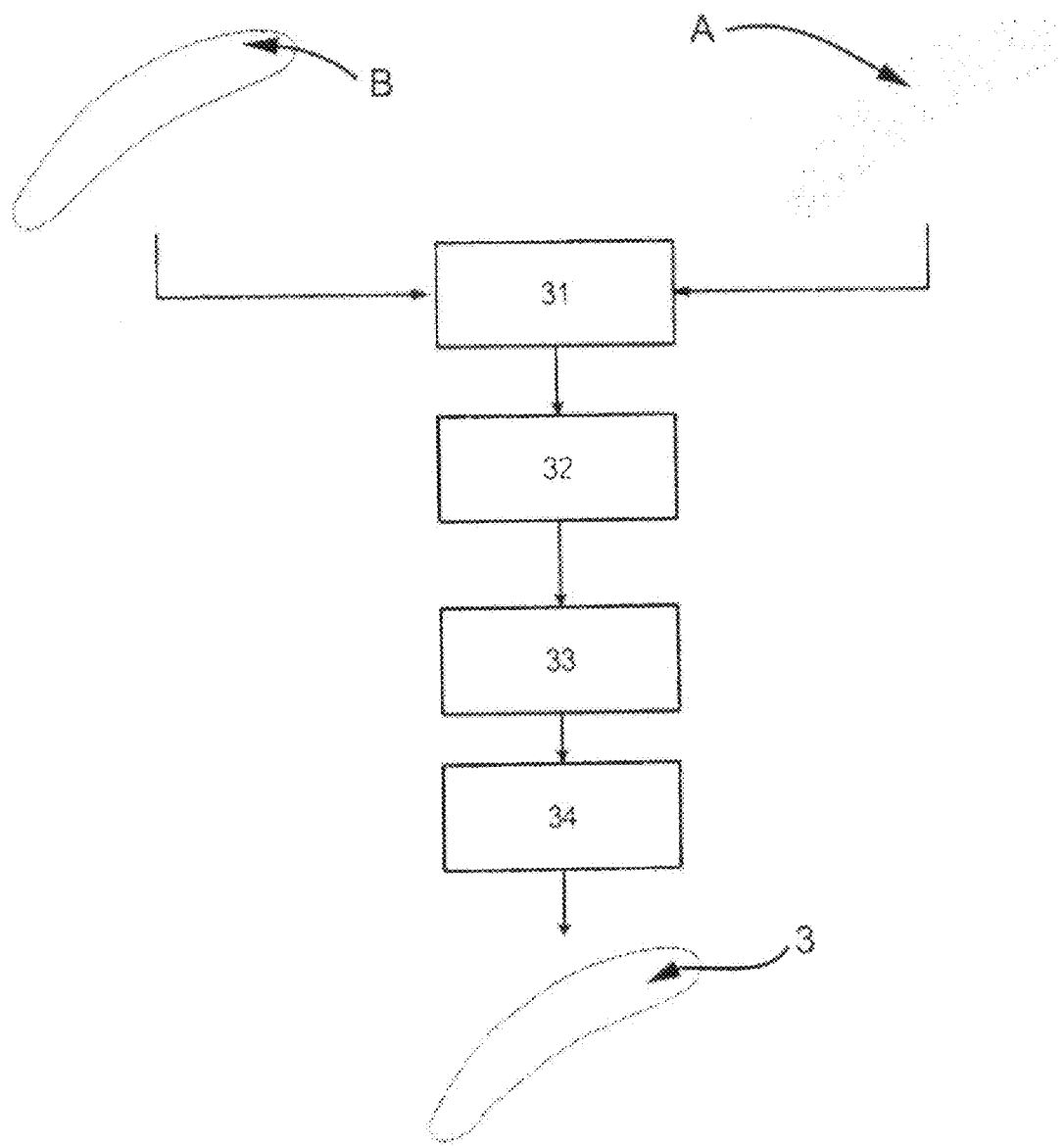
FIG. 3 depicts the steps of the method of the invention for repairing a damaged component.

With reference to FIG. 3, a cluster of points A of a damaged component 1, to which material may have been added 2, is compared with the theoretical model B in order to create an overall topological model 31 of the component 1.

Figure 6:
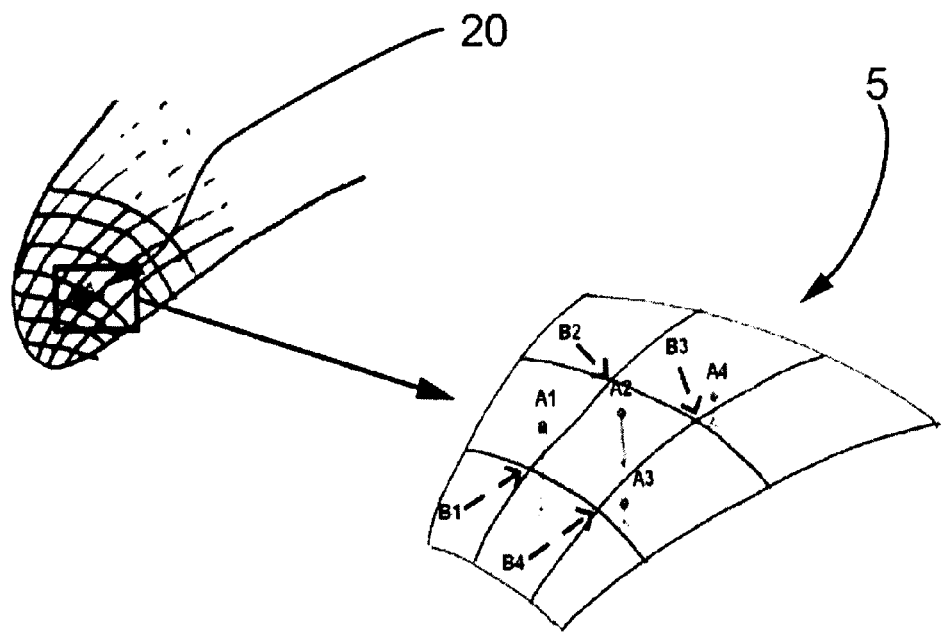
FIG. 6 depicts a zone of the component workpiece that has excess thickness.

Analysis of the overall topological model 32 makes it possible to identify local topological zones corresponding to the zones that have excess or insufficient thickness. After analysis, a step of calculating the machining path 33 and a step of machining 34 the component 1 are performed. With reference to FIG. 6, these local topological zones 20 are respectively compared with the EDCs 102 in the database 100.

This comparison is performed by difference in shape, by scale ratio and by analysis as a function of the position of the mesh elements of the theoretical mesh B.

The database 100 contains a wide variety of EDCs 102 in order to make it possible to identify the selected local topological zone 20, the EDCs 102 constituting a base within the mathematical sense of the term. When the EDC has been identified, the parameters 101 associated with the EDC 102 are read from the database 100, these parameters 102 allowing the mesh B of the local topological zone 20 to be deformed.

This comparison step is performed for each local topological zone 20 in order to obtain the set of local parameters 101 needed for deforming the theoretical mesh B. These parameters 101 are needed for calculating the machining path 33 on the theoretical model B in order to restore the correct aerodynamic profile to the damaged component 1.

When a local topological zone 20 cannot be identified from the database 100, the mesh of said zone 20 is deformed by an expert who determines the control points to be displaced and their displacement vector.

The local topological zone and the deformation parameters for this zone are entered into the database 100, allowing the parameters calculated by the expert to be used again at a later date. The enrichment of the database 100 makes it possible to prevent an expert having to solve similar problems a number of times over. The deformation by morphing is automated.

1 Component workpiece
2 Addition of material (patch)
3 Machined component
5 Elementary deformation configuration
11 Step of adding material
12 Step of making a volume-based measurement of the component
20 Local topological zone
21 Aerodynamic calculation step
22 Step of creating the theoretical model
31 Creation of the topological model
32 Analysis of the global topological model
33 Calculation of machining path
34 Machining
41 Deformation of the theoretical model using morphing
100 Database
101 Parameters of the morphing function
102 Elementary deformation configurations

The invention claimed is:

1. A method of using machining to repair a component workpiece, from a known and undamaged profile of the component, the method comprising:

acquiring coordinates of points on an envelope of the component workpiece, the set of points forming a cluster of points;

comparing the known and undamaged profile with the cluster of points in order to define zones on the component workpiece that have excess or insufficient thickness;

deforming the profile using a morphing method so that the deformed profile interpolates the cluster of points, the deformation of the profile using a morphing function, and machining the component workpiece using a machine tool parameterized on the basis of the morphing function, wherein the deforming of the profile involves comparing each zone of the component workpiece that has excess or insufficient thickness with elementary deformation configurations (EDCs) each in the form of a mesh portion simulating the known and undamaged profile, and previously measured points simulating points of the cluster of points obtained from a damaged workpiece other than the component workpiece, the elementary deformation configurations (EDCs) being filed in a database, identifying an EDC from the database of EDCs for the zone of the component workpiece based on the comparison of the zone of the component workpiece and the EDCs filed in the database, using expert-defined EDC deformation parameters for the identified EDC to determine the morphing function, the parameters being stored in the database, and defining the morphing function required to deform the known and undamaged profile portion of the identified EDC to match the previously measured points portion of the identified EDC, and wherein the expert-defined EDC deformation parameters comprise coordinates of at least one control point to be displaced on the mesh portion simulating the known and undamaged profile, and at least one displacement vector for the at least one control point to displace to deform the mesh portion and to reduce differences between the mesh portion and previously measured points simulating points of the cluster of points obtained from a damaged workpiece other than the component workpiece.

2. The method as claimed in claim 1, wherein the profile of the component includes a mesh of points.

3. The method as claimed in claim 2, wherein the coordinates and displacement vectors of the points of the mesh that are to be displaced in order to interpolate the cluster of points, known as the control points, are parameters of the morphing function.

4. The method as claimed in claim 1, wherein a three-dimensional measurement machine (3DMM), with or without physical sensing, acquires the coordinates of the points on the envelope of the component workpiece.

5. The method as claimed in claim 1, wherein the component workpiece is a component to which material has been added.

6. The method as claimed in claim 1, further comprising associating parameters of the morphing function with an elementary deformation configuration (EDC).

7. The method as claimed in claim 3, wherein the morphing function parameters are entered by an expert.

8. The method as claimed in claim 1, wherein if no match is found to any elementary deformation configuration (EDC) in the database, input will be required from an expert, and stored in the database for future use.

9. The method as claimed in claim 1, wherein the elementary deformation configurations (EDCs) are parameterized surfaces defined by Bezier curves.

10. The method as claimed in claim 1, wherein the database comprises EDCs for which an optimal mesh deformation has been calculated to interpolate the previously measured points simulating points of the cluster of points obtained from a damaged workpiece other than the component workpiece, for various mesh portions and previously measured points.

11. The method as claimed in claim 1, wherein each zone of the component workpiece that has excess or insufficient thickness is compared to EDCs from the database based on differences in shape, scale ratio, and analysis as a function of a position of the mesh portion simulating the known and undamaged profile.

* * * * *

UNITED STATES PATENT AND TRADEMARK OFFICE
CERTIFICATE OF CORRECTION

PATENT NO.        : 8,881,392 B2  
APPLICATION NO.   : 12/532173  
DATED             : November 11, 2014  
INVENTOR(S)       : Gerard Derrien et al.

Page 1 of 1

It is certified that error appears in the above-identified patent and that said Letters Patent is hereby corrected as shown below:

In the Specification

Column 5, line 18, change "A defined" to --$\Delta$ defined--.

Signed and Sealed this
Fourth Day of August, 2015

Michelle K. Lee
*Director of the United States Patent and Trademark Office*